United States Patent Office 3,202,518
Patented Aug. 24, 1965

3,202,518
METHOD OF MAKING HIGH SURFACE
AREA CERAMICS
Osgood J. Whittemore, Jr., Princeton, Mass., assignor to
Norton Company, Worcester, Mass., a corporation of
Massachusetts
No Drawing. Filed June 5, 1961, Ser. No. 114,649
5 Claims. (Cl. 106—40)

This invention relates to the treatment and improvement of naturally occurring silicate minerals. More particularly, this invention relates to improved porous ceramic material having high surface area and to a method of manufacturing the same.

The structure and properties of the silicate minerals are determined by the manner in which the continuity of the silica tetrahedra ($SiO_4$) is spread throughout the structure. The Si-O-bond is the strongest in the structure and the oxygen atom has the largest radius, so that the manner of arrangement of the skeleton of silicon and oxygen atoms determines the number and position of the basic cations which completes the crystal. Although the terms "orthosilicate" and "metasilicate" are often used for compounds that can be referred to the hypothetical acids $H_4SiO_4$ and $H_2SiO_3$, the silicates are not salts of various silicic acids, and their structures are not consistent with a derivation from such acids. The complexity of the possible structures is increased by the possibility of replacement of some silicon atoms by aluminum atoms with consequent change in the ratio of silicon to oxygen and resultant alteration in the number of basic atoms required to satisfy the valence rules. The various silicate compounds may be grouped according to the type of Si-O network and the scheme of nomenclature usually followed classifies the silicates into six groups. The nesosilicates are composed of minerals which have separate $SiO_4$ groups in which the four oxygen atoms surrounding a silicon atom are not linked to any other silicate atom. Hence, each oxygen has an unsatisfied valency of $-1$ which must be satisfied with basic atoms. This group is represented by zircon. The inosilicates have Si-O chains and often develop in long flexible fibers such as in amphibole asbestos. The phyllosilicates are characterized by the presence of Si-O sheets formed by the linkage of three corners of each $SiO_4$ tetrahedron to neighbors, so that each tetrahedron has three shared and one free oxygen. This group contains the majority of the hydrosilicates and is represented by the clay minerals, talc, pyrophyllite and chrysotile, a fibrous mineral which is a common form of asbestos.

The tectosilicates are characterized by a continuous framework of linked tetrahedra. Some of the quadrivalent silicon atoms are replaced by aluminum which necessitate the incorporation into the structure of metallic cations to satisfy the valence rules. The feldspars are representative of this group as is petalite. The sorosilicates, or group silicates are of a relatively small number and have two $SiO_4$ tetrahedra linked together to form $Si_2O_7$ groups. Finally, the cyclosilicates or ring silicates, have rings formed by the linking together of several $SiO_4$ tetrahedra. Wollastonite is an example of this group.

The hydrosilicates are an important group of the silicate minerals and are largely represented by the clay minerals. Clays as they occur in nature are rocks, consolidated or unconsolidated, that are usually composed of one or more of the clay minerals (hydrosilicates of aluminum, iron or magnesium) with or without other rock and mineral particles. Clays are characterized usually by extreme fineness of particles, often colloidal in size, and by wide variations in physical and ceramic properties and in mineral and chemical compositions.

Clays of these various properties and compositions and the various hydrosilicate earths are useful in many capacities, for example, as catalysts, catalyst carriers, and absorbents. For these purposes the clays and earths are acid treated, shaped into solid agglomerates, dried and fired at temperatures below those at which vitrification will occur.

Porosity and absorption of the fired hydrosilicates are important properties of ceramic materials. Porosity is the volume of pores in the clay or earth referred to the volume of material. Absorption is a determination of the pore space that may be filled by water or other fluid and is expressed in terms of weight. Both properties are a function of the hydrosilicate and the temperature treatment it has received.

Hydrosilicates which have been shaped into agglomerates and fired in the above manner suffer somewhat from a decrease in porosity and absorption. As a result of this factor, they have lost preference in some processes for which they are seemingly well suited. For example, in the field of hydrocarbon conversion, synthetic gels have been produced which have greatly improved properties as catalysts over fired clays. However, these gels are priced at over twice the amount of the clay materials. Also, silicate minerals other than the hydrosilicates have not been considered as possible sources of catalysts, catalyst supports or absorbents since their natural porosity and absorption are comparatively very low.

It is therefore an object of this invention to provide a silicate mineral in a strong fired form having high surface area and absorption.

It is another object of this invention to provide such a product which is especially suitable for use as a catalyst, catalyst carrier, absorbent, etc.

It is still another object of this invention to provide such a product from natural silicate minerals, said product having properties equal to or greater than synthetic materials yet being more easily and economically produced.

It is a further object of this invention to provide a method for the production of silicate minerals in a form having improved surface area and absorption.

It is a still further object of this invention to provide such a method in which readily available and economical raw materials may be utilized.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from the detailed description.

It has been found that these objects may be attained by mixing together a silicate mineral and an alkali metal carbonate or alkaline earth metal carbonate, firing the mixture and leaching to remove any acid soluble residue and to increase the absorption powers and surface area thereof. The temperature of firing is below the vitrification range of the silicate mineral.

More particularly, it has been found that a naturally occurring silicate mineral, e.g., zircon, the feldspars, wollastonite, petalite, etc., and particularly the hydrosilicate clays or earths, e.g., kaolin, ball clay, diatomaceous earth, attapulgite, bentonite, vermiculite, talc, asbestos, pyrophyllite and mixtures thereof, may be mixed with a carbonate, for example, calcium carbonate, in sufficient water to produce a plastic consistency. Desirable agglomerates such as pellets, microporous membranes, spheres, microspheres and tubes may be formed of the plastic mixture and suitably dried. The formed materials are then fired at a temperature between about 600° and 1400° C., preferably between about 800° and 1300° C. for from a few minutes to 60 hours, preferably about three hours. The minimum time of firing is dependent on the mass of the shape to be fired. Microspheres, for example, may be fired in a few seconds in a fluidized bed furnace. The fired articles are then leached and dried. The resulting fired materials are strong yet exhibit a greatly increased surface area and consequent absorptive power.

While almost any naturally occurring silicate mineral may be used in this invention, it has been found that hydrosilicates having a relatively low iron content are especially desirable when the finished product is to be used as a cracking catalyst or catalyst support. For example, agglomerates of treated kaolin, asbestos and talc materials and a mixture of talc and kaolin in the form of pellets or spheres have been found to be particularly effective as catalysts in hydrocarbon conversion. However, hydrosilicates having therein larger amounts of iron are efficiently utilized in the process of this invention in the preparation of iron containing catalysts for use, for example, in automobile catalytic mufflers.

Although the limits do not appear to be critical, the carbonate is utilized in an amount, depending on the characteristics desired in the final product of up to 60% by weight of the total mix. In general, improved results can be expected with addition of as little as 20% by weight of calcium carbonate (or an equivalent amount of other suitable carbonates) to the original mix. Lower amounts of carbonate naturally produce a less desirable product.

The following illustrates the use of calcium carbonate in the admixture with a silicate material to produce a useful high surface area material.

*Example 1*

Georgia kaolin, 60 parts by weight and whiting (325 mesh), 40 parts by weight were mixed together dry. To produce an extrudable mixture, 27 parts by weight of water were added and the resulting plastic mix was extruded in the form of rods which were then cut to form pellets and dried. Portions of the pellets were fired for three hours at 900, 1000, 1100, or 1200° C. After cooling, they were leached in hot 6 normal hydrochloric acid, washed with water and dried. Surface areas were then determined by nitrogen adsorption (BET method) as follows:

| Firing temperature, °C. | Surface area, square meters/gram |
|---|---|
| 900 | 250 |
| 1000 | 140 |
| 1100 | 209 |
| 1200 | 72 |

The lower value for the sample fired at 1000° C. was probably due to inadequate acid treatment. All of the portions of the fired and acid treated pellets were strong and could not readily be crushed by finger pressure.

Where the high surface area material is not for use as a cracking catalyst, in applications where soda content is not undesirable, sodium carbonate may be employed in admixture with the silicate mineral to produce high surface area materials, such as in the following example, all parts being by weight.

*Example 2*

Georgia kaolin, 60 parts, and soda ash, 40 parts, were mixed together dry. A plastic mass was formed by the addition of 37 parts of water and the mixture was extruded into rod form and cut into pellets and dried. The pellets were divided into three portions and fired at different temperatures. After cooling, they were leached with hot 6 normal hydrochloric acid, washed with water and dried. Their surface areas were then determined as follows (BET method):

| Firing temperature, °C. | Surface area, square meters/gram |
|---|---|
| 800 | 631 |
| 900 | 587 |
| 1000 | 554 |

Samples of kaolin in pellet form without addition of a carbonate, fired at 900° C. and below and acid treated similarly to Examples 1 and 2 were weak and could be broken by finger pressure. Samples fired at 1000° C. and above and acid treated similarly to Examples 1 and 2 had surface areas of 10 or less square meters per gram.

I claim:

1. A method of making a porous ceramic material of high surface area comprising firing a mixture of silicate mineral and an acid decomposable carbonate at a temperature above 600° C. and below that of vitrification of the silicate mineral, and acid leaching the fired product whereby the surface area of the fired product is significantly increased.

2. A method as in claim 1 in which the acid decomposable carbonate is calcium carbonate.

3. A method as in claim 1 in which the acid decomposable carbonate is sodium carbonate.

4. A method as in claim 1 in which the silicate mineral is kaolin.

5. A method as in claim 1 in which the carbonate is calcium carbonate and in which hydrochloric acid is employed as the acid leaching agent.

References Cited by the Examiner

UNITED STATES PATENTS

| 2,472,490 | 6/49 | Plank | 106—40 XR |
| 2,706,844 | 4/55 | Nicholson | 106—40 |
| 2,786,772 | 3/57 | Stewart et al. | 106—40 |
| 2,941,960 | 6/60 | Hindlin et al. | 252—450 |
| 2,967,185 | 1/61 | Becker | 252—450 |

TOBIAS E. LEVOW, *Primary Examiner.*

JOHN R. SPECK, *Examiner.*